(No Model.)

J. & S. ZIMMER.
ICE CREAM MOLD AND DIPPER.

No. 574,185. Patented Dec. 29, 1896.

Witnesses:
A. R. Appleman Jr
A. M. Wilson

Inventors.
John Zimmer
and Susanna Zimmer
By Henry C. Evert Atty.

UNITED STATES PATENT OFFICE.

JOHN ZIMMER AND SUSANNA ZIMMER, OF PITTSBURG, PENNSYLVANIA.

ICE-CREAM MOLD AND DIPPER.

SPECIFICATION forming part of Letters Patent No. 574,185, dated December 29, 1896.

Application filed April 14, 1896. Serial No. 587,456. (No model.)

*To all whom it may concern:*

Be it known that we, JOHN ZIMMER and SUSANNA ZIMMER, citizens of the United States of America, residing at Pittsburg, in the county of Allegheny and State of Pennsylvania, have invented certain new and useful Improvements in Ice-Cream Molds and Dippers, of which the following is a specification, reference being had therein to the accompanying drawings.

This invention relates to certain new and useful improvements in ice-cream molds and dippers, and has for its object to construct a mold and dipper to be used in ice-cream and like substances that may be operated with one hand instead of requiring the use of both hands, as in the ordinary construction.

A further object of the invention is to construct a mold and dipper of the above-referred-to class that will be extremely simple in its construction, strong, durable, effectual in its operation, and comparatively inexpensive to manufacture; furthermore, a mold that will be extremely easy to operate and that may be made in any shape that may be desired.

With the above and other objects in view the invention finally consists in the novel construction, combination, and arrangements of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1:
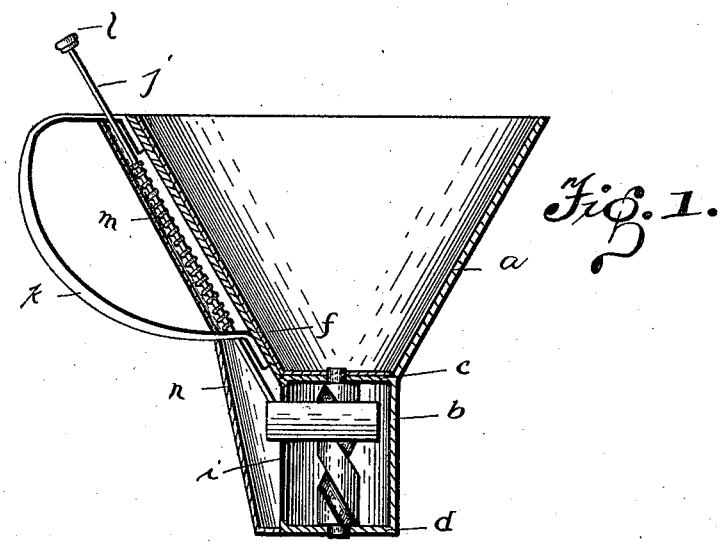
Figure 2:
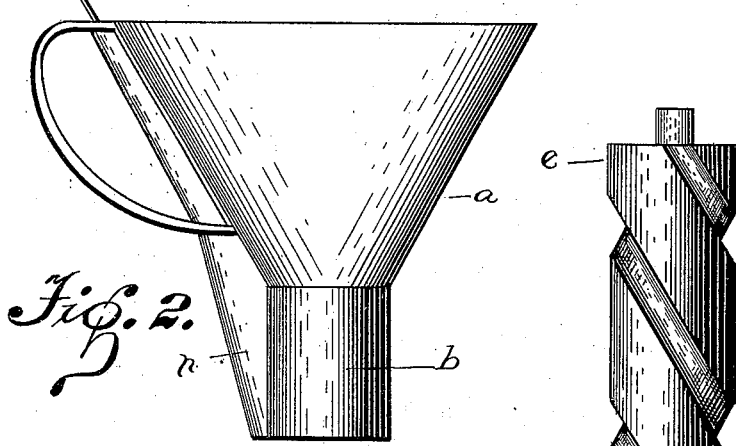
Figure 3:
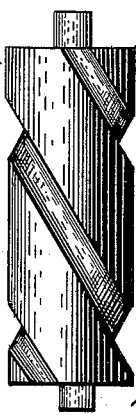
Figure 4:
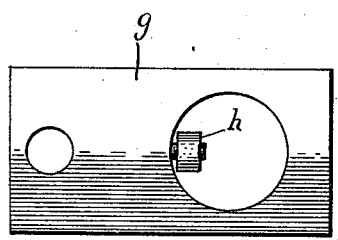

Figure 1 is a vertical sectional view of our improved mold and dipper. Fig. 2 is a side elevation. Fig. 3 is an enlarged view, in side elevation, of the worm-screw. Fig. 4 is a top plan view of the operating-block and wheel.

In the drawings, $a$ represents the mold, which is shown herein partly coned shaped and provided underneath with a cylinder $b$, the top $c$ of this cylinder forming the bottom of the mold and the bottom $d$ forming a support or journal for the worm-screw $e$, the upper end of which is journaled in a similar manner in the bottom $c$, and extends through the same sufficiently far in order to secure the cutting-arm $f$ thereto. The worm-screw $e$ operates through the block $g$, in the aperture of which is secured a roller $h$, adapted to travel in the spiral groove of the worm and is secured thereto. A rod $j$, which passes upward through the handle $k$, is provided on the top with a knob $l$. A spiral spring $m$ encircles the rod and rests against the lower portion of the handle to retract the block to its normal position after having been depressed, and a casing $n$ is provided around the rod and the end of the block $g$, which prevents the substance from reaching the working parts of the device.

The operation of our improved ice-cream mold will be readily apparent from the views of the same, which we have shown in the drawings. The operator grasps the handle $k$ and places the thumb on the knob $l$, when by pressing down thereon the block $g$ will be forced downward, causing the roller $h$ to travel in the spiral groove of the worm-screw, which will revolve the same and at the same time rotate the cutting-knife $f$, which is rigidly secured to said worm-screw $e$. When the pressure is released from the rod $j$, the spring $m$ will reverse the movement of the block, causing the latter to rise again and the cutting-knife to return to its former position. The roller $h$, which is adapted to travel in the spiral groove, will cause the operation of these parts to be extremely easy, and the cutters will readily loosen the substance from the mold and allow the same to fall into the plate or saucer provided therefor when the mold is turned upside down.

The great convenience of this device will be at once readily apparent, as it will require but one hand to operate the same, while in the ordinary construction both hands are required, one to hold the dipper and the other to turn the cutters and loosen the cream from the same.

Should it be desired, it will be readily observed that two cutter-arms could be employed instead of one, as shown in the drawings, yet in practice we have found that the one cutter is sufficient. It will also be observed that this and various other changes may be made in the details of construction without departing from the general spirit of our invention.

Having fully described our invention, what we claim as new, and desire to secure by Letters Patent, is—

1. In an ice-cream mold and dipper, the mold, a cylinder secured thereunder, a worm screw journaled in said cylinder, a block operating in the cylinder and having a roll or wheel to engage the groove of the worm-screw, said block reciprocating through the cylinder and a rod for operating the block, as and for the purpose described.

2. An ice-cream mold and dipper consisting of a mold with a cylinder at the bottom, a worm-screw supported and operating in the cylinder, a block carrying a roller to operate in the groove of the worm-screw, a cutter-arm secured at the top of the screw, a rod for operating the block and a spring on the rod for retracting the block as and for the purpose described.

In testimony whereof we affix our signatures in presence of two witnesses.

JOHN ZIMMER.
SUSANNA ZIMMER.

Witnesses:
ALFRED M. WILSON,
H. C. EVERT.